United States Patent [19]

Yanadori et al.

[11] 4,366,856
[45] Jan. 4, 1983

[54] APPARATUS FOR STORING HEAT

[75] Inventors: Michio Yanadori, Hachioji; Kohji Kamejima, Shimoinayoshi; Hideki Tanaka, Shimoinayoshi; Minoru Kano, Shimoinayoshi; Motokazu Uchida, Tokyo; Yoritsune Abe, Ohiramachi, all of Japan

[73] Assignee: Hitachi, Ltd., Tokyo, Japan

[21] Appl. No.: 212,341

[22] Filed: Dec. 3, 1980

[30] Foreign Application Priority Data

Dec. 5, 1979 [JP] Japan .................. 54-156810

[51] Int. Cl.³ .......................................... F28D 21/00
[52] U.S. Cl. ............................ 165/104.17; 165/10; 62/351; 62/352
[58] Field of Search ............... 165/104.17, 104.11; 62/351, 73, 352

[56] References Cited

U.S. PATENT DOCUMENTS 1,936,575 11/1933 Barret et al. .................... 62/351 X
2,907,183 10/1959 Roberts ........................... 62/351 X
2,941,377 6/1960 Nelson ............................ 62/351 X
3,997,001 12/1976 Chubb ......................... 165/104.17 X
4,271,681 6/1981 Sehertz ....................... 65/104.17 X Primary Examiner—Albert W. Davis, Jr.
Attorney, Agent, or Firm—Antonelli, Terry & Wands

[57] ABSTRACT

A heat exchanger for cooling is immersed in a vessel for storing heat filled with a heat-storing material of latent heat type. The heat exchanger for cooling is positioned at an upper level in the vessel when a heat-storing material having a higher specific gravity in a crystal state than in a liquid state, such as calcium chloride hexahydrate, is used, whereas at a lower level in the vessel when a heat-storing material having a lower specific gravity in a cystal state than in a liquid state such as water, is used.

Crystals of a heat-storing material formed and deposited on the outer periphery of the heat exchanger for cooling when the apparatus for storing heat is in operation are accumulated in the vessel for storing heat as blocks.

18 Claims, 14 Drawing Figures

– 1 –

APPARATUS FOR STORING HEAT

BACKGROUND OF THE INVENTION

1. Field of the Invention

This invention relates to an apparatus for storing heat, which comprises a heat exchanger for cooling immersed in a heat-storing material of the latent heat type in a vessel for storing heat, and the present apparatus for storing heat can be utilized in air conditioners of the heat pump type, heat-storing cooler-heaters, etc.

2. Description of the Prior Art

Generally, an apparatus of the latent heat type for storing heat has a vessel for storing heat, which is filled with a heat-storing material of the latent heat type, for example, calcium chloride hexahydrate ($CaCl_2.6H_2O$, melting point 28° C.) and provided therein with a heat exchanger for recovering heat or storing heat. For example, when the heat possessed by a heat-storing material is recovered to heat rooms, the liquid heat-storing material reaches the solification point, and crystals of the heat-storing material deposit on the periphery of the heat exchanger. Resistance to heat transfer increases with increasing thickness of deposited crystal layer, and a heat exchange capacity is considerably reduced.

To prevent such a reduction, the flow of the heat transfer medium through the heat transfer exchanger is occasionally discontinued, or a heat transfer medium of a higher temperature is occasionally passed through the heat exchanger to release the deposited crystals of heat-storing material. However, the deposited crystals of heat-storing material melt concentrically around the heat exchanger even according to the above-mentioned procedure, and thus are very hard to release from the periphery of heat exchanger.

To solve the problem, flange-like partition plates are provided at appropriate positions along the entire length of the pipe of heat exchanger to partition the longitudinal direction of the pipe, and radial fin-like partition plates are provided along the entire length of the pipe of heat exchanger to partition the peripheral direction of the pipe, thereby allowing the deposited crystals of heat-storing material to be readily released in a divided manner from the pipe. However, according to such a structure, the crystals of heat-storing material released from the vessel for storing heat, and the space factor of the released crystals of heat-storing material is deteriorated thereby, and there remains inevitably some effectively less utilizable liquid heat-storing material, necessitating use of an apparatus with a larger dimension. Since the partition plates must be provided along the entire length of the pipe, many partition plates, particularly many fin-type partition plates, are required for the release. When a heat-storing material having a relatively small heat conductivity such as calcium chloride hexahydrate is used, that is, when a heat-storing material with a higher fin efficiency is used, the crystals of heat-storing material will deposit on the entire surfaces of the pipes and the partition plates, but the deposited crystals of heat-storing material melt only around the heat exchanger and cannot be released therefrom in a divided manner, even if it is tried to release the deposited crystals of heat-storing material.

SUMMARY OF THE INVENTION

An object of the present invention is to provide an apparatus for storing heat, which can readily release crystals of heat-storing material deposited on the periphery of a heat exchanger in a vessel for storing heat in a divided manner.

The present apparatus for storing heat can accumulate crystals of heat-storing material deposited on the periphery of a heat exchanger in a vessel for storing heat in a regular manner as rectangular blocks therein.

PREFERRED EMBODIMENTS OF THE INVENTION

Figure 1:
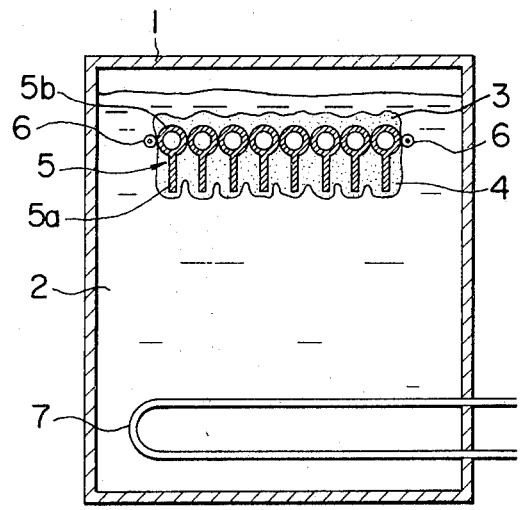
FIGS. 1 and 2 are cross-sectional views of an embodiment of an apparatus for storing heat according to the present invention.
Figure 2:
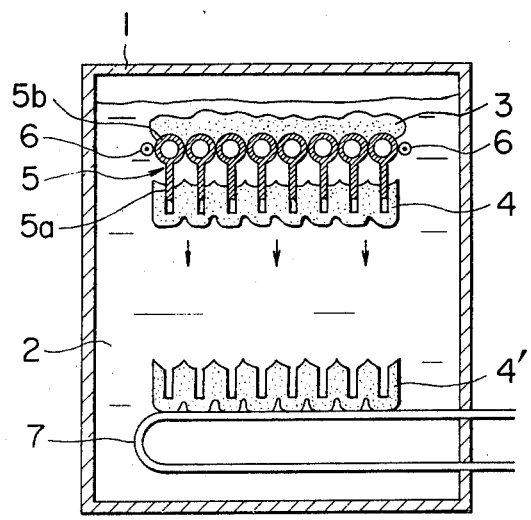

One embodiment of an apparatus for storing heat according to the present invention will be described below, referring to FIGS. 1-4.

A vessel 1 for storing heat is filled with a heat-storing material 2 of the latent heat type, for example, calcium chloride hexahydrate ($CaCl_2.6H_2O$, melting point 28° C.), and a heat exchanger 5 for cooling is immersed at a higher level in the heat-storing material 2 in the vessel 1. The heat exchanger 5 comprises a group of a plurality of pipes 5b each with plate fins 5a at their bottoms, the pipes being arranged horizontally in contact with one another at their sides, and heaters 6 at the outer periphery of the group of the pipes 5b as elements for releasing deposited crystals 3 of heat-storing material.

A heat exchanger 7 for heating is immersed at a lower level in the heat-storing material 7 of latent heat type in the vessel 1 for storing heat. The heat exchanger 7 for heating is used for heating and melting the crystals 3 of heat-storing material, and solar energy, waste heat, etc. can be used as heat source for the heat exchanger 7.

Figure 3:
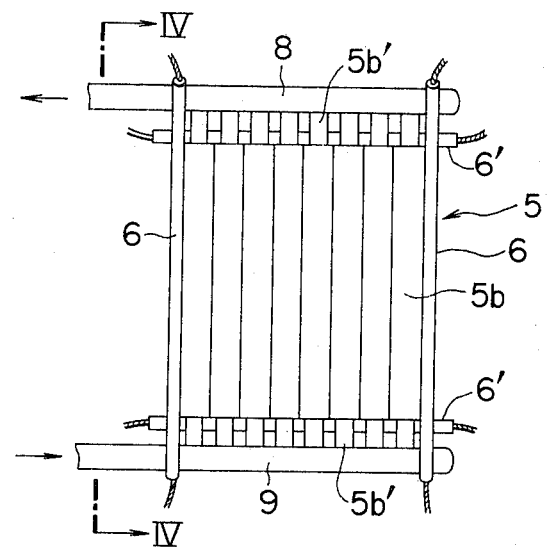
FIG. 3 is a plan view of an embodiment of a heat exchanger for cooling in the apparatus for storing heat shown in FIGS. 1 and 2.
Figure 4:
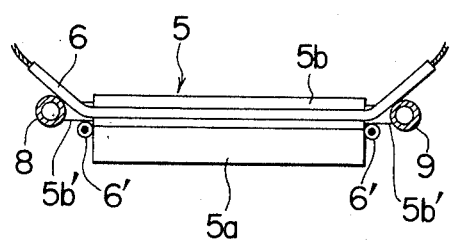
FIG. 4 is a view along line IV—IV in FIG. 3

FIG. 3 shows detail of the heat exchanger 5 and FIG. 4 is a side view of the heat exchanger along line IV—IV in FIG. 3. The individual pipes 5b are all connected to an inlet manifold 8 and an outlet manifold 9 for a heat transfer medium through smaller pipes 5b'. Heaters 6 are provided horizontally in contact with the outer periphery of the group of pipes 5b in the longitudinal direction, and heaters 6' are also provided horizontally at ends of the group of pipes 5b at both sides in a direction perpendicular to the pipes 5b. Cord heaters can be inserted into the pipes 5b as heaters 6 and 6'.

Recovery of the heat possessed by the heat-storing material in container 1 for storing heat and utilization of the recovered heat in room heating will be described below according to the apparatus for storing heat with the above-mentioned structure.

When a heat transfer medium of lower temperature is passed through the pipes 5b of heat exchanger 5, the liquid heat-storing material 2 releases the heat of solidification and turns solid. The heat of solidification is transferred to the heat transfer medium in the pipes 5b, and the stored heat is recovered, while crystals 3 of heat-storing material deposit on the periphery of pipes 5b and fins 5a. The larger the thickness of the layer of deposited crystal 3 of heat-storing material, the larger the resistance to heat transfer. Thus, when the layer of deposited crystals 3 has some thickness, a switch valve (not shown in the drawings) is changed to discontinue flow of the heat transfer medium of lower temperature and pass a heat transfer medium of higher temperature through the pipes 5b. For example, when the heat exchanger is used as an evaporator for room heating in a refrigeration cycle of air conditioner, a switch valve of refrigeration cycle is changed to pass a heat transfer medium of higher temperature from a compressor to the heat exchanger 5. At the same time, the heaters 6 and 6' are turned on. Among the deposited crystals 3 of heat-storing material on the periphery of pipes 5b and fins 5a of heat exchanger 5, those in contact with the periphery of pipes 5b and fins 5a and heaters 6 and 6' then start to melt.

Generally, inorganic hydrated salts as a heat-storing material of latent heat type have a larger specific gravity in a solid state than in a liquid state. For example, calcium chloride hexahydrate ($CaCl_2.6H_2O$) has the specific gravity of about 1.68 g/cm$^3$ in a solid state, and about 1.50 g/cm$^3$ in a liquid state. Thus, the deposited masses 4 of crystals 3 of heat-storing material, i.e. the masses at the bottom of heat exchanger 5, settle down at the bottom of the vessel for storing heat as a rectangular mass, and accumulate regularly. Since the crystals 3 of heat-storing material are removed from the periphery of pipes 5b and fins 5a, the resistance to heat transfer is again decreased. That is, after a certain period of time from the start to recover the stored heat, the deposited crystals 3 of heat-storing material are made to be released from the periphery of pipe 5b and fins 5a in the above-mentioned manner, whereby a considerable increase in the resistance to heat transfer can be prevented.

When an appropriate amount of the crystals 4' of heat-storing material released from the heat exchanger 5 is accumulated at the bottom of the vessel 1 for storing heat, a fluid heated by the solar energy or waste heat is made to pass through the heat exchanger 7 for heating at the bottom of the vessel 1 for storing heat, whereby the crystals 4' of heat-storing material are heated and melted, and the heat is stored again in the liquid heat-storing material 2. The foregoing operations are to be repeated.

Figure 5:
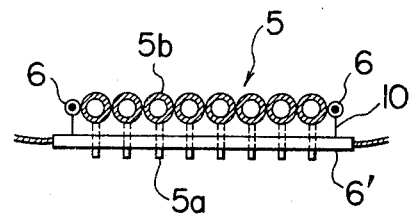
FIG. 5 is a cross-sectional front view of another embodiment of a heat exchanger for cooling in the present apparatus for storing heat.
Figure 6:
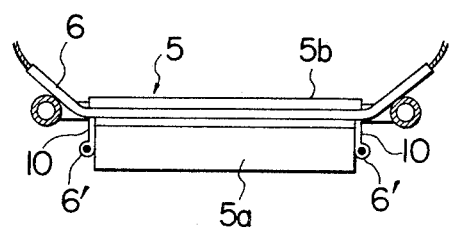
FIG. 6 is a side view of the apparatus shown in FIG. 5.
Figure 7:
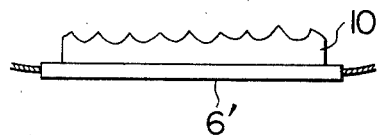
FIG. 7 is a front view of the essential part of the heat exchanger for cooling as shown in FIGS. 5 and 6.

FIGS. 5-7 show another embodiment of heat exchanger, where partition plates 10 having a rugged edge are fixed to heaters 6' provided perpendicularly to the pipes 5b at both ends of the pipes 5b so that the partition plates 10 can be engaged with the pipes 5b. Other members are the same as those of the heat exchangers shown in FIGS. 1-4. According to such a structure, the amount of crystals 4 of heat-storing material growing between the heaters 6' and the pipes 5b can be made as small as possible, and even if the crystals grow, they can be melted as rapidly as possible.

Figure 8:
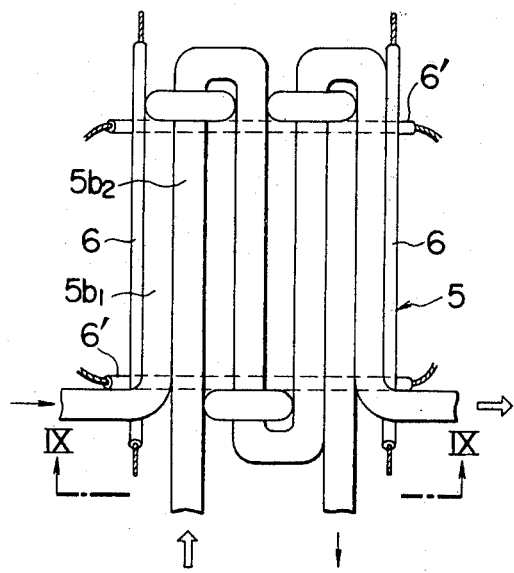
FIG. 8 is a plan view of further embodiment of a heat exchanger for cooling.
Figure 9:
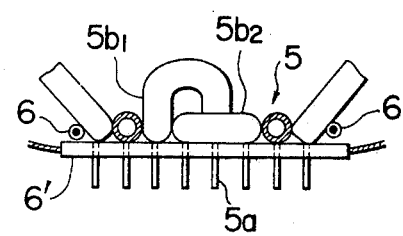
FIG. 9 is a view along line IX—IX in FIG. 8.

FIGS. 8 and 9 show a further embodiment of heat exchanger 5 according to the present invention, where two pipes $5b_1$ and $5b_2$ are provided in a zigzag structure by means of vertical U bends and horizontal U bends, respectively, so that they can be horizontally in contact with each other. According to such a structure, the manifolds 8 and 9 and smaller pipes 5b' of the heat exchanger as shown in FIGS. 1-4 can be omitted. That is, the structure can be made simpler.

Figure 10:
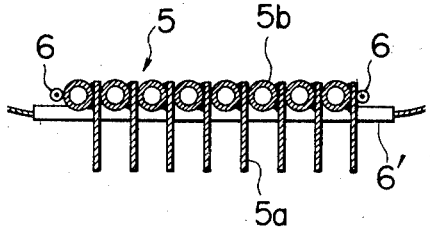
FIG. 10 is a cross-sectional front view of further embodiment of a heat exchanger for cooling.
Figure 11:
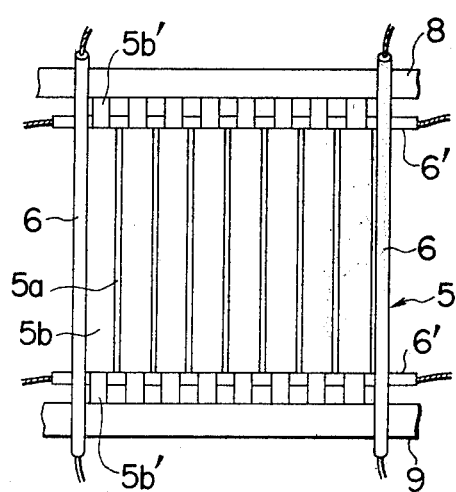
FIG. 11 is a plan view of the heat exchanger shown in FIG. 10.

FIGS. 10 and 11 show a still further embodiment of heat exchanger 5 according to the present invention, where fins 5a and pipes 5b are separately fabricated, and the fins 5a are fixed to the sides of the pipes 5b by welding, etc. According to such a structure, pipes with fins can be readily fabricated.

Figure 12:
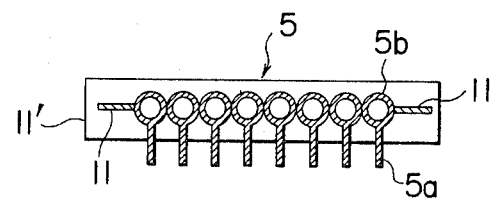
FIG. 12 is a cross-sectional view of a heat exchanger for cooling in further embodiment of an apparatus for storing heat according to the present invention.
Figure 13:
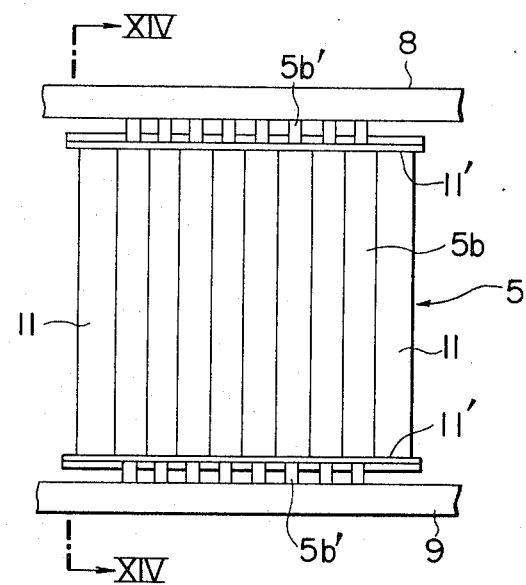
FIG. 13 is a plan view of the heat exchanger shown in FIG. 12.
Figure 14:
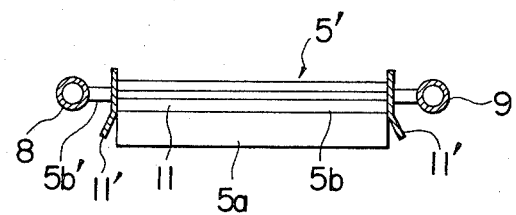
FIG. 14 is a cross-sectional view along line XIV—XIV in FIG. 3.

FIGS. 12-14 show a still further embodiment of heat exchanger 5 according to the present invention, where releasing plates 11 and 11' of poor thermal conductor such as fluorocarbon resin, etc. are provided as elements for releasing the crystals 3 of heat-storing material in place of the heaters 6 of FIGS. 1-4. According to such a structure, it is not necessary to pass electric current through the heaters to release the deposited crystals 3 of heat-storing material, and the electric consumption can be saved thereby. As can be seen from the drawings, the plates 11 project horizontally from opposite sides of the exchanger 5 between vertically disposed plates 11'. Additionally, FIG. 14 shows that a free edge of the plates 11', which extends across the ends of pipes 5b, is angled outwardly away from them.

In all the foregoing embodiments, fins 5a are fixed to pipes 5b, but the present invention can be effectively carried out with pipes 5b without fins 5a.

In the foregoing description, the heat exchanger for cooling is provided at a higher level in the heat-storing material in the vessel for storing heat, and the heat exchanger for heating is provided at a lower level, and the heat stored from the heat exchanger for heating is recovered by the heat exchanger for cooling, and the recovered heat is utilized in room heating operation. However, the coldness stored from the heat exchanger for cooling can be recovered by the heat exchanger for heating on the contrary, and the recovered coldness can be utilized in room cooling operation. Even in the latter case, there is no change in the releasing action of the deposited crystals of heat-storing material.

In the foregoing embodiments, the heat-storing material having a higher specific gravity in a crystal state than in a liquid state, for example, calcium chloride hexahydrate ($CaCl_2.6H_2O$) is used, but when coldness is stored for room cooling, using a heat-storing material having a lower specific gravity in a crystal state than in a liquid state, for example, water, is used, a heat exchanger for cooling is provided at a lower level in the heat-storing material and a heat exchanger for heating at a higher level in the heat-storing material. Even if a heat-storing material having a high heat conductivity such as water is used, the deposited crystals of heat-storing material on the periphery of heat exchanger can be also readily released in a divided manner.

As described above, the crystals of heat-storing material can be readily and regularly formed as blocks and the heat can be stored in a vessel for storing heat according to the present invention, and thus the resistance to heat transfer at the heat exchanger can be reduced, and the heat recovery from the heat-storing material can be effectively carried out. That is, an apparatus for storing heat can be made smaller in size.

What is claimed is:

1. Apparatus for storing heat of the type having a heat exchanger for cooling immersed in a latent heat type heat-storing material contained in a container for storing heat, wherein said heat exchanger comprises a plurality of pipes horizontally arranged in contact with each other at respective adjacent sides in a manner forming a group having the pipes all disposed on the same level within the container, and means for causing crystals of heat-storing material deposited on the periphery of the group of pipes to be released therefrom as a first mass at an upper side of the group and as a second mass at a lower side of the group.

2. An apparatus according to claim 1, wherein a heat-storing material having a higher specific gravity in a crystal state than in a liquid state is used, and the heat exchanger for cooling is provided at a higher level in the heat-storing material.

3. An apparatus according to claim 1, wherein a heat-storing material having a lower specific gravity in a crystal state than in a liquid state is used, and the heat exchanger for cooling is provided at a lower level in the heat-storing material.

4. Apparatus according to claim 1, wherein said group of the pipes is provided with a plurality of fins, each of said fins being associated with a respective one of said pipes.

5. Apparatus according to claim 4, wherein each fin is integrally formed so as to project from its associated pipe.

6. Apparatus according to claim 4, wherein each fin is attached in contact with a side of its associated pipe.

7. Apparatus according to claim 4 or 5 or 6, wherein said pins project vertically downwardly from said pipes.

8. An apparatus according to claim 1 or 2 or 3 or 4 or 5 or 6, wherein the means for causing crystals of heat-storing material to release comprise a heating means.

9. Apparatus according to claim 8, wherein said heating means comprises a first pair of heaters disposed parallel to said pipes in contact with opposite sides of said group and a second pair of heaters disposed perpendicular to said pipes at opposite ends of said group.

10. Apparatus according to claim 9, wherein said second pair of heaters is disposed below said first pair of heaters.

11. Apparatus according to claim 10, wherein the heaters of the second pair are provided with partition plates extending toward the heaters of the first pair for restricting the amount of crystals growing between the heaters.

12. Apparatus according to claim 11, wherein the partition plates have a rugged edge for engaging against the pipes.

13. Apparatus according to claim 1 or 2 or 3 or 4 or 5 or 6, wherein the means for causing crystals of heat-storing material to release comprises a releasing plate arrangement of poor thermal conductor.

14. An apparatus according to claim 13, wherein said releasing plate arrangement comprises a first pair of releasing plates disposed parallel to said pipes in contact with opposite sides of said group and a second pair of releasing plates disposed perpendicular to said first pair of pipes at opposite ends of said group.

15. An apparatus according to claim 14, wherein the plates of said first pair of releasing plates are horizontally disposed.

16. An apparatus according to claim 15, wherein the plates of said second pair of plates are vertically disposed in engagement with the ends of said pipes.

17. An apparatus according to claim 16, wherein a free edge of each of the plates of the second pair, which extends across the group of pipes, is angled outwardly away from the respective end of the group of pipes.

18. An apparatus according to claim 17, wherein said first pair of plates extends between said second pair of plates.

* * * * *